United States Patent [19]

Murayama

[11] Patent Number: 5,381,240
[45] Date of Patent: Jan. 10, 1995

[54] COMMUNICATION APPARATUS

[75] Inventor: Masahiro Murayama, Kawasaki, Japan

[73] Assignee: Canon Kabushiki Kaisha, Tokyo, Japan

[21] Appl. No.: 891,819

[22] Filed: Jun. 1, 1992

[30] Foreign Application Priority Data

Jun. 3, 1991 [JP] Japan .................. 3-131197

[51] Int. Cl.6 ............................................. H04N 1/00
[52] U.S. Cl. ................................................. 358/436
[58] Field of Search ................... 358/434, 435, 436; 379/92; 340/825.06, 825.07, 825.08

[56] References Cited

U.S. PATENT DOCUMENTS 3,752,904  8/1973  Waterbury .
4,025,853  5/1977  Addeo .
4,438,824  3/1984  Mueller-Schloer .
4,741,021  4/1988  Kotani et al. .
4,811,111  3/1989  Kurokawa .
4,843,479  6/1989  Yoshino et al. ................ 358/257
4,980,677  12/1990  Hotta et al. ................ 340/825.06

Primary Examiner—Bentsu Ro
Attorney, Agent, or Firm—Fitzpatrick, Cella, Harper & Scinto

[57] ABSTRACT

A communication apparatus for performing a communication according to a predetermined communication procedure, includes a memory for storing in advance data indicating a name such as an abbreviation of each distant station to communicate with, and a controller for comparing data indicating a name of a distant station included in a received predetermined communication procedure signal with the data stored in the memory, and changing a communication procedure according to the comparison result.

13 Claims, 12 Drawing Sheets

| PART 1 | PART 2 | PART 3 | PART 4 |
|--------|--------|--------|--------|
| 0 TO 9 | 0 TO 9 | 0 TO 9 | A TO Z, a TO z |

COMMUNICATION APPARATUS

BACKGROUND OF THE INVENTION

1. Field of the Invention

The present invention relates to a communication apparatus using a called terminal identifier or a calling terminal identifier (to be referred to as a TiD hereinafter) in a communication procedure.

2. Related Background Art

As a conventional apparatus of this type, a facsimile apparatus of Group 4 (G4) of the CCITT recommendation is known.

In some G4 facsimile apparatuses, special communication modes such as a closed network communication mode, a polling mode, a confidential communication mode, and the like are available. Such special communication modes are set by utilizing non-standardized capabilities (to be referred to as NSC hereinafter) in the communication procedure.

However, since the above-mentioned NSCs can be desirably set by manufacturers, they have different formats in units of types of apparatuses. For this reason, when the types of apparatuses are different (in particular, when manufacturers are different), communications in the above-mentioned special communication modes cannot be performed.

Thus, according to the present invention, when a communication is performed in one of the above-mentioned special communication modes, whether or not the TiD of a station to be called is registered is checked to allow a special communication in only a communication with a specific station. When the TiD of the station is registered, the above-mentioned special communication is allowed.

In this case, whether or not the TiD of a given station to be called coincides with a registered TiD is checked. At this time, however, when it is checked if the two TiDs perfectly coincide with each other, the following problems are pose:

(1) In a TiD checking operation performed when various communication modes are realized by checking TiDs at calling and called stations, if capital letters and small letters are distinguished from each other, the degree of freedom of a TiD input at a called station is limited. For example, it cannot be determined that TiDs "081-12345=ABCD" and "081-12345=Abcd" coincide with each other.

(2) In the TiD checking operation performed when various communication modes are realized by checking TiDs at calling and called stations, the degree of freedom of a TiD input at a called station is limited. For example, it cannot be determined that TiDs "081-12345=ABCD" and "081-12345=AbcdInc" coincide with each other.

It cannot also be determined that "081-12345=A-shop" and "081-12345=Bshop" coincide with each other.

As applications for collating telephone numbers, there are U.S. Pat. application Ser. No. 289,014 (filed on Dec. 23, 1988, now U.S. Pat. No. 5,239,385), U.S. patent application Ser. No. 442,721 (filed on Nov. 29, 1989, now abandoned), and U.S. patent application Ser. No. 547,127 (filed on Jul. 3, 1990, now abandoned). However, no applications that can solve the above-mentioned problems have been proposed yet.

SUMMARY OF THE INVENTION

It is an object of the present invention to improve a communication apparatus in consideration of the above-mentioned problems.

It is another object of the present invention to provide a communication apparatus for performing communication control using terminal identifier data included in a session layer signal of a communication procedure.

It is still another object of the present invention to provide a communication apparatus, which compares terminal identifier data included in a communication procedure signal of a received session layer with data registered in advance, and changes a communication procedure according to the comparison result.

It is still another object of the present invention to increase the degree of freedom upon determination of a coincidence in comparison by performing comparison using converted collation data or partially using collation data when received terminal identifier data is compared with the collation data which is registered in advance.

Other objects of the present invention will become apparent from the detailed description of the embodiment taken in conjunction with the accompanying drawings.

DETAILED DESCRIPTION OF THE PREFERRED EMBODIMENTS

An embodiment of the present invention will be described in detail below with reference to the accompanying drawings.

A TiD will be described in detail below. A TiD is data included in signals (CSS (cession start command), RSSP (session start positive response), RSSN (session start negative response)) in a session layer of a communication procedure based on the CCITT recommendation T.62. The CSS is a signal sent from a calling station to a called station, and includes a terminal identifier of the calling terminal. With this signal, the called station can detect a calling station. The RSSP or RSSN is a response signal for the CSS, and is sent from a called station to a calling station. The RSSP or RSSN includes a terminal identifier of the called terminal. With this signal, the calling station can detect a called station.

Figure 11:
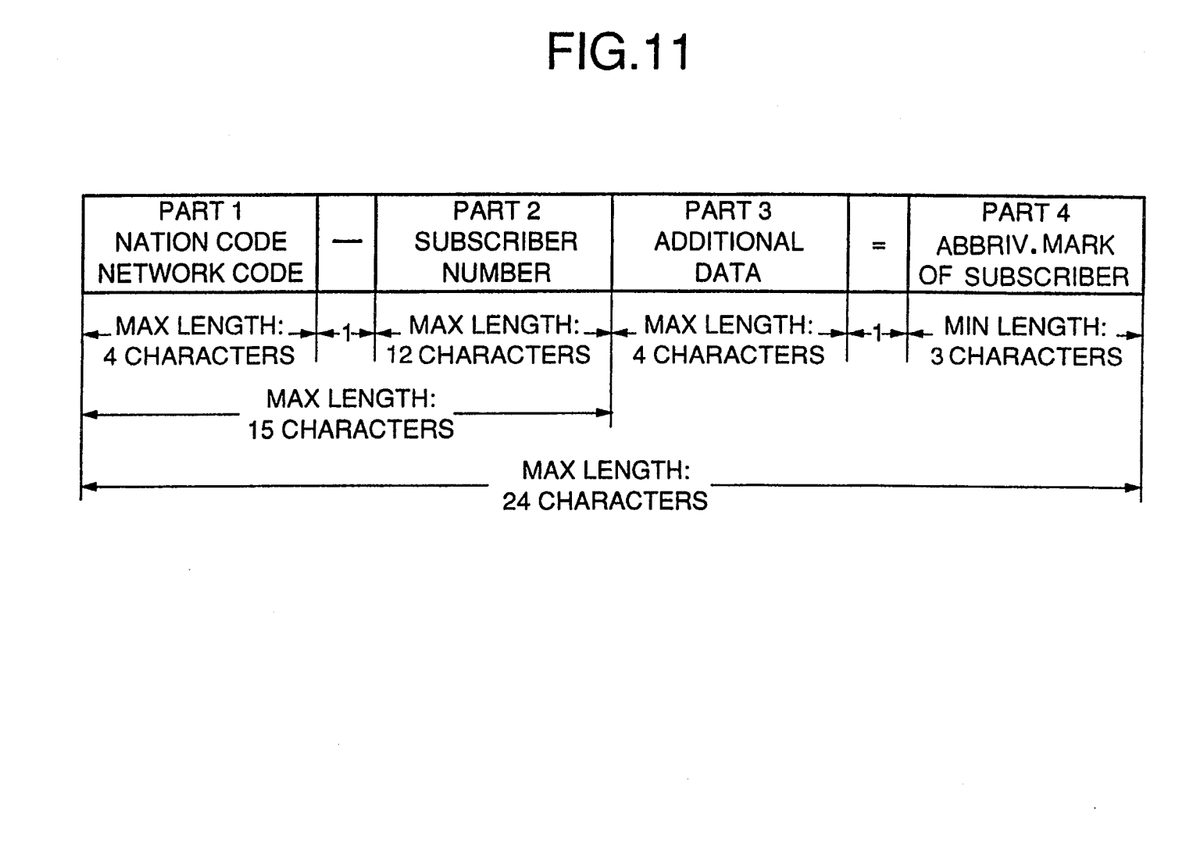
FIG. 11 is a view showing a TiD format.
Figure 12:
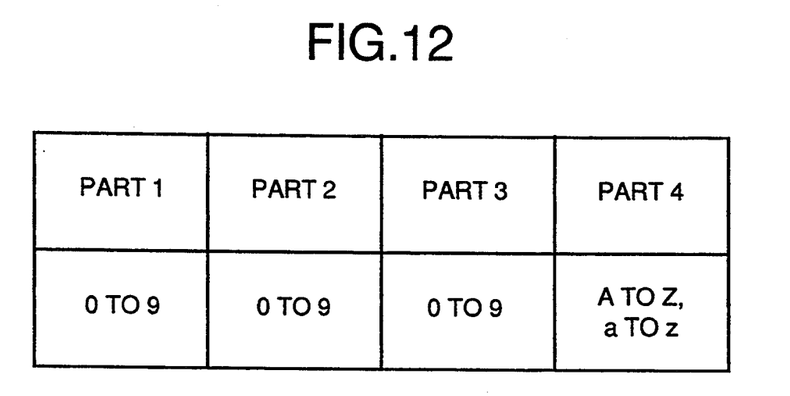
FIG. 12 is a view showing characters which can be input as a TiD.

Note that this data is indispensable data which must be added to the CSS, RSSP, and RSSN signals. The format of the TiD is specified in the CCITT recommendation, as shown in FIGS. 11 and 12. In particular, as for Part 4, since there are no special limitations as long as letters A to Z and a to z are used, the TiD data can be desirably set in each station.

Figure 1:
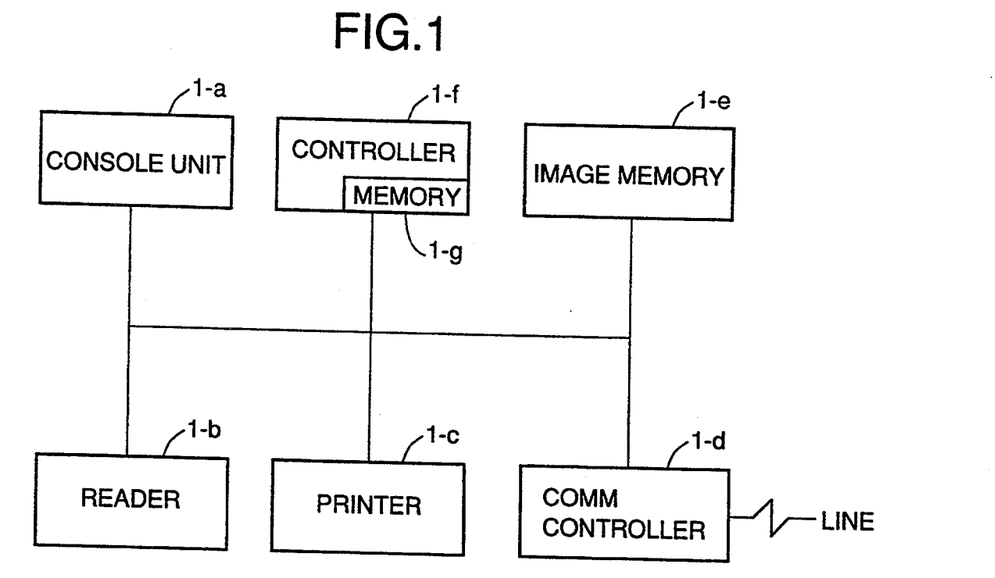
FIG. 1 is a block diagram showing an arrangement of a facsimile apparatus according to an embodiment of the present invention.

FIG. 1 is a block diagram showing an arrangement of a G4 facsimile apparatus according to this embodiment.

A console unit 1-$a$ allows input operations using a ten-key pad, various function keys, alphabet keys (A to Z), and the like, and has a display function.

A reader 1-$b$ reads an original image, binarizes the read image into black and white data, and stores the binary data in an image memory 1-$e$.

A printer 1-$c$ reads out data from the image memory 1-$e$, and records the readout data.

A communication controller 1-$d$ controls G4 communications, and encodes/decodes an image.

The image memory 1-$e$ stores an image read by the reader 1-$b$, or a received image.

A controller 1-$f$ controls the units 1-$a$ to 1-$e$, and comprises, e.g., a microcomputer, a ROM, a RAM, and the like.

A control memory 1-$g$ is used by the controller 1-$f$.

A TiD check method will be described below, and thereafter, a closed network communication utilizing the TiD check method will be exemplified.

Figure 6:
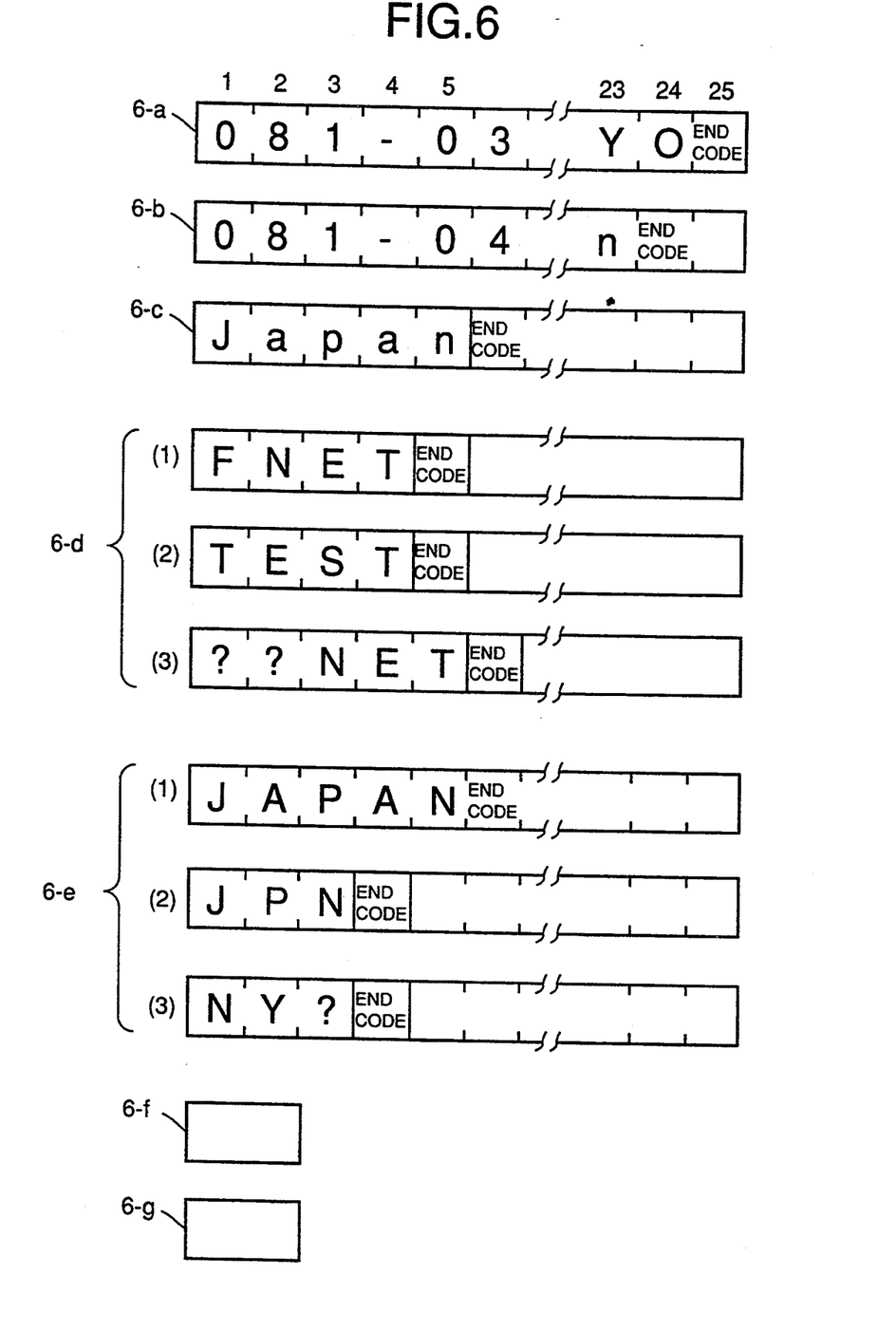
FIG. 6 is a view showing the format of a control memory.

The TiD check method will be described below. In order to check a TiD, data shown in FIG. 6 are necessary. These data are stored in the control memory 1-$g$. In the TiD check method of this embodiment, a Part 4 portion shown in FIG. 11 is checked. Therefore, Part 4 data of a TiD is registered in advance to perform a check operation. The data shown in FIG. 6 will be described below.

An own station TiD 6-$a$ is registered using input enabled characters shown in FIG. 12 in the format shown in FIG. 11.

A called station TiD 6-$b$ is added to the RSSP or RSSN (from a called station to a calling station) in a calling state, or is added to the CSS in a called state.

A work TiD 6-$c$ stores a portion corresponding to Part 4 extracted from the called station TiD to perform a TiD check operation.

Calling check TiD1 to TiD3 6-$d$(1) to 6-$d$(3) are TiDs to be compared with a TiD of a called station in a calling state. In this embodiment, three different calling check TiDs can be registered. Since Part 4 data of a TiD is to be checked in this embodiment, only Part 4 data is registered. In order to easily discriminate capital letters and small letters, only capital letters are input. Furthermore, as a character for inhibiting a character at a designated position from being checked (to be referred to as a skip character hereinafter), "?" can be input.

Called check TiD1 to TiD3 6-$e$(1) to 6-$e$(3) are TiDs to be compared with a TiD of a called station in a called state. In this embodiment, three different called check TiDs can be registered. Like in the calling check TiD, only Part 4 data can be registered, and capital letters and a skip character can be input.

Common to the TiDs 6-$a$ to 6-$e$, an end code is added to the end of each TiD. The end code can be any value as long as it is a value expressing other than A to Z, a to z, and ?. In this embodiment, the end code is $00_H$.

A counter i 6-$f$ is used as a counter for indicating the position of a character in a called station TiD in FIG. 7 (to be described later), and is also used as a counter for indicating the position of a character in a called check TiD/work TiD in FIG. 8.

Figure 7:
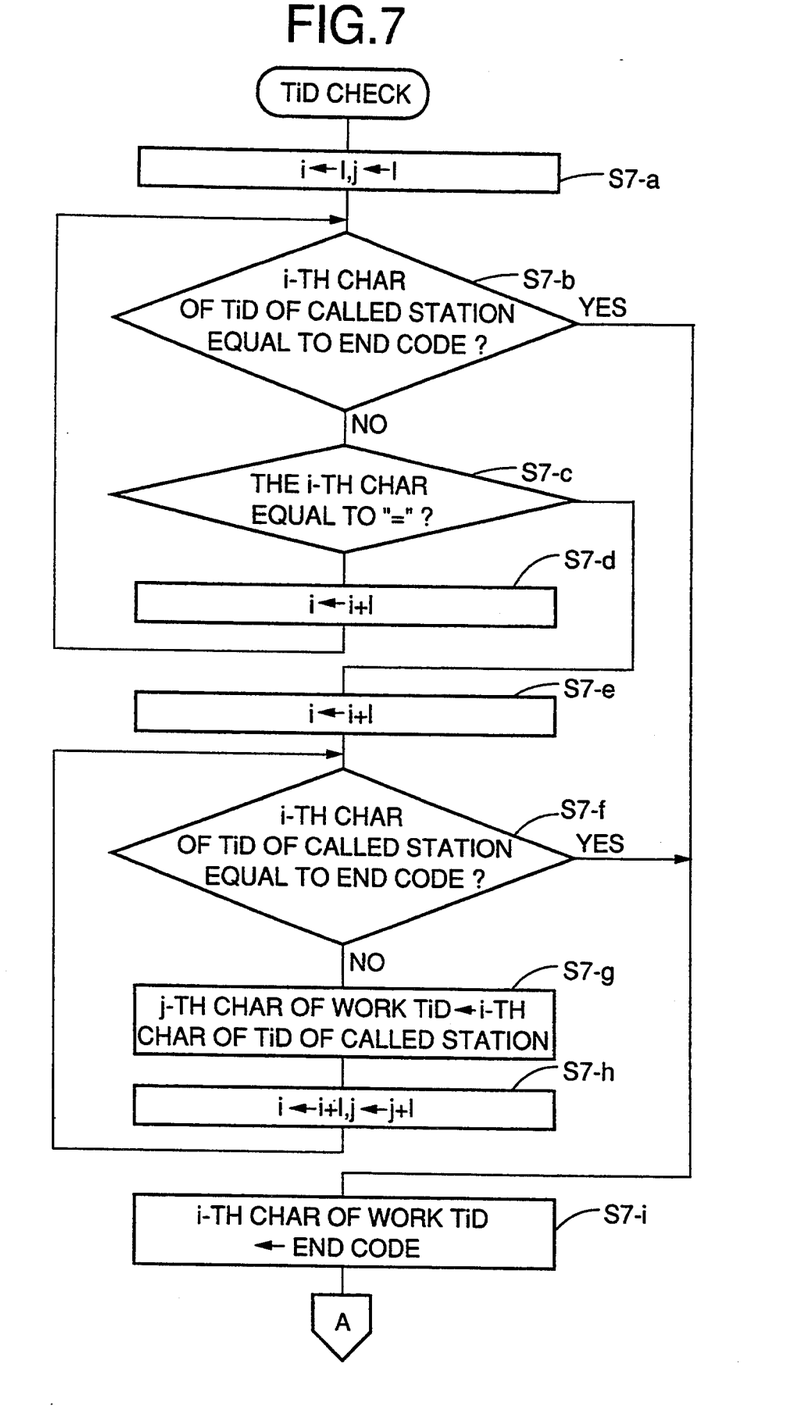
FIG. 7 is a flow chart showing a control operation in a TiD check mode.
Figure 8:
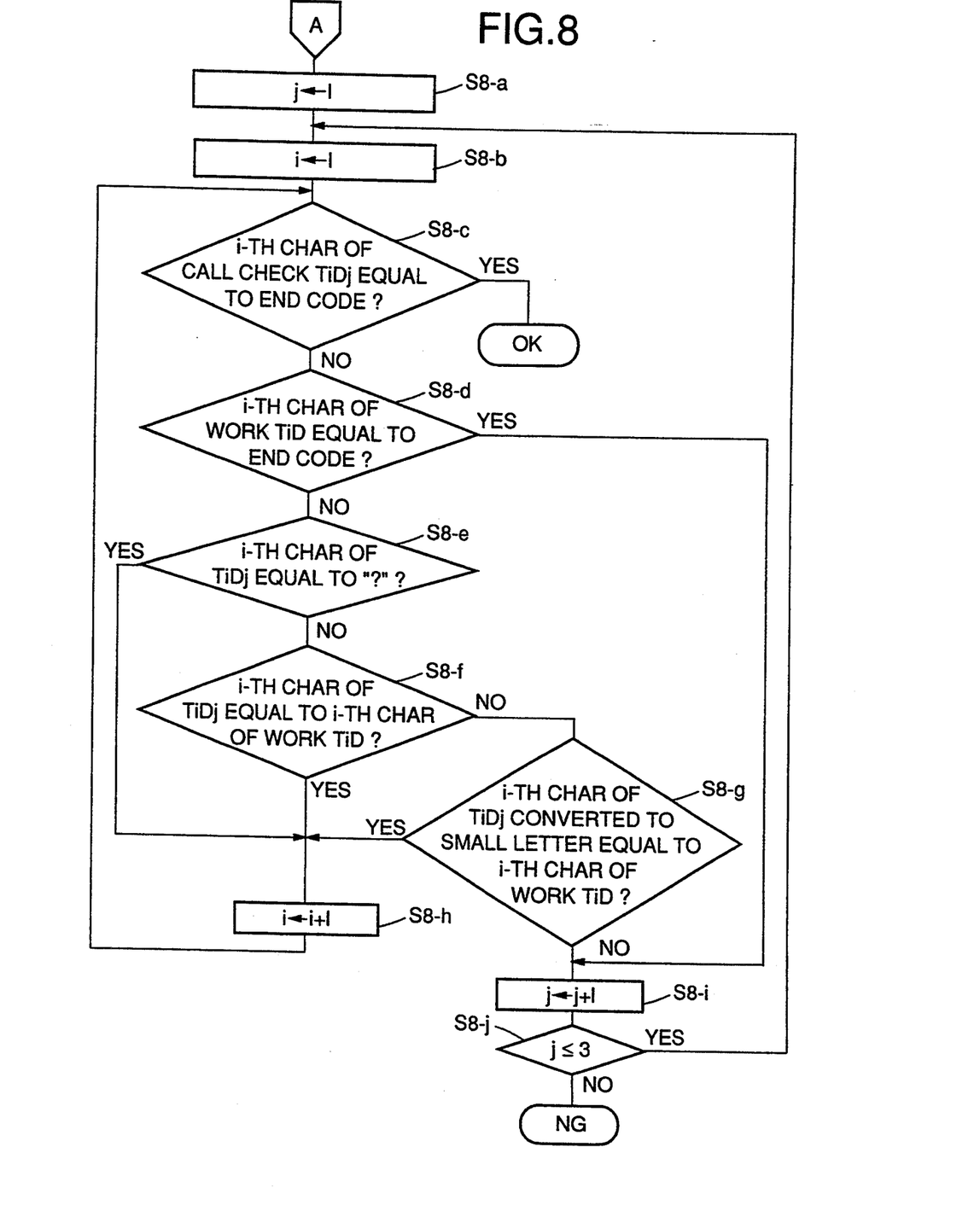
FIG. 8 is a flow chart showing a control operation in the TiD check mode.

A counter j 6-$g$ is used as a counter for indicating the position of a character in a work TiD in FIG. 7, and is also used as a counter for indicating one of called check TiD1 to TiD3 in FIG. 8.

A case will be described below wherein a called station TiD and a called check TiD are compared with each other using the data shown in FIG. 6. FIGS. 7 and 8 are flow charts showing the control operations of the controller 1-$f$ in this case. FIG. 7 shows a flow for extracting Part 4 data from a called station TiD, and storing the extracted data in a work TiD, and FIG. 8 shows a flow for comparing the work TiD with called check TiD1 to TiD3 thereafter.

In step S7-$a$, the counters i and j are initialized to "1".

In step S7-$b$, it is checked if the i-th character of the called station TiD is the end code.

If YES in step in S7-$b$, the flow advances to step S7-$i$; otherwise, the flow advances to step S7-$c$.

In step S7-$c$, it is checked if the i-th character of the called station TiD is "=", i.e., a delimiter code between Part 4 and Part 3. If YES in step S7-$c$, the flow advances to step S7-$e$, and copy processing to a work TiD is performed; otherwise, the flow advances to step S7-$d$. In step S7-$d$, the counter i is incremented by one to perform comparison with the next character of the called station TiD, and the flow then returns to step S7-$b$.

When the flow advances from step S7-$c$ to step S7-$e$, the counter i is incremented by one to obtain a character next to "=" of the called station TiD, and the flow then advances to step S7-$f$.

It is checked in step S7-$f$ if the i-th character of the called station TiD is the end code.

If YES in step S7-$f$, the flow advances to step S7-$i$; otherwise, the flow advances to step S7-$g$, and the i-th character of the called station TiD is copied to the j-th character of the work TiD.

In step S7-$h$, the counters i and j are respectively incremented by "1", and the flow returns to step S7-$f$.

In this manner, steps S7-$f$ to S7-$h$ are repeated, and Part 4 data of the called station TiD is copied from the beginning of the work TiD. Upon completion of the copy processing, the flow advances to step S7-$i$.

In step S7-$i$, an end code is added to the j-th character of the work TiD. Thereafter, the flow advances to step SS-$a$ in FIG. 8.

In step S8-$a$ in FIG. 8, "1" is set in the counter j to perform comparison with the called check TiD1, and in step S8-$b$, "1" is set in the counter i to perform comparison from the first character.

In step S8-$c$, it is checked if the i-th character of the called check TiDj is the end code. If YES in step S8-$c$, it is determined that TiDs coincide with each other, and the processing is ended; otherwise, the flow advances to step S8-$d$ to check if the i-th character of the work TiD is the end code. If YES in step S8-$d$, it is determined that the TiDs do not coincide with each other, and the flow advances to step S8-$i$; otherwise, the flow advances to step S8-$e$. In this processing, when the work TiD, i.e., Part 4 data of the called station TiD, is shorter than the called check TiD, it is determined that the TiDs do not coincide with each other. When the work TiD is longer than the called check TiD, a coincidence is determined. This is also apparent since the processing in step S8-c is performed prior to the processing in step S8-d.

When the flow advances from step S8-d to step S8-e, it is checked if the i-th character of the called check TiDj is a skip character. If YES in step S8-e, the flow advances to step SS-h; otherwise, the flow advances to step S8-f.

In step S8-f, the i-th character of the called check TiDj is compared with the i-th character of the work TiD. If the two characters coincide with each other, the flow advances to step S8-h; otherwise, the flow advances to step S8-g.

Since a non-coincidence is determined in step S8-f, the i-th character of the called check TiD is converted to a small letter, and the converted character is compared with the i-th character of the work TiD in step S8-g. If a coincidence is found between the two characters, the flow returns to step S8-h; otherwise, the flow advances to step S8-i. Conversion from a capital letter to a small letter is attained by the following equation:

Small letter to be compared = capital letter to be compared − (value of "A") + (value of "a")

In step S8-h, the counter i is incremented by one to perform comparison with the next character, and the flow then returns to step S8-c.

In step S8-i, the counter j is incremented by one to perform comparison with the next called check TiD. If it is determined in step S8-j that a coincidence is not found after all the called check TiDs are checked, the processing is ended. If a non-checked called check TiD still remains, the flow returns to step S8-b.

In this manner, the TiD can be checked.

A closed network communication at a called station using the TiD check operation will be described below.

Figure 2:
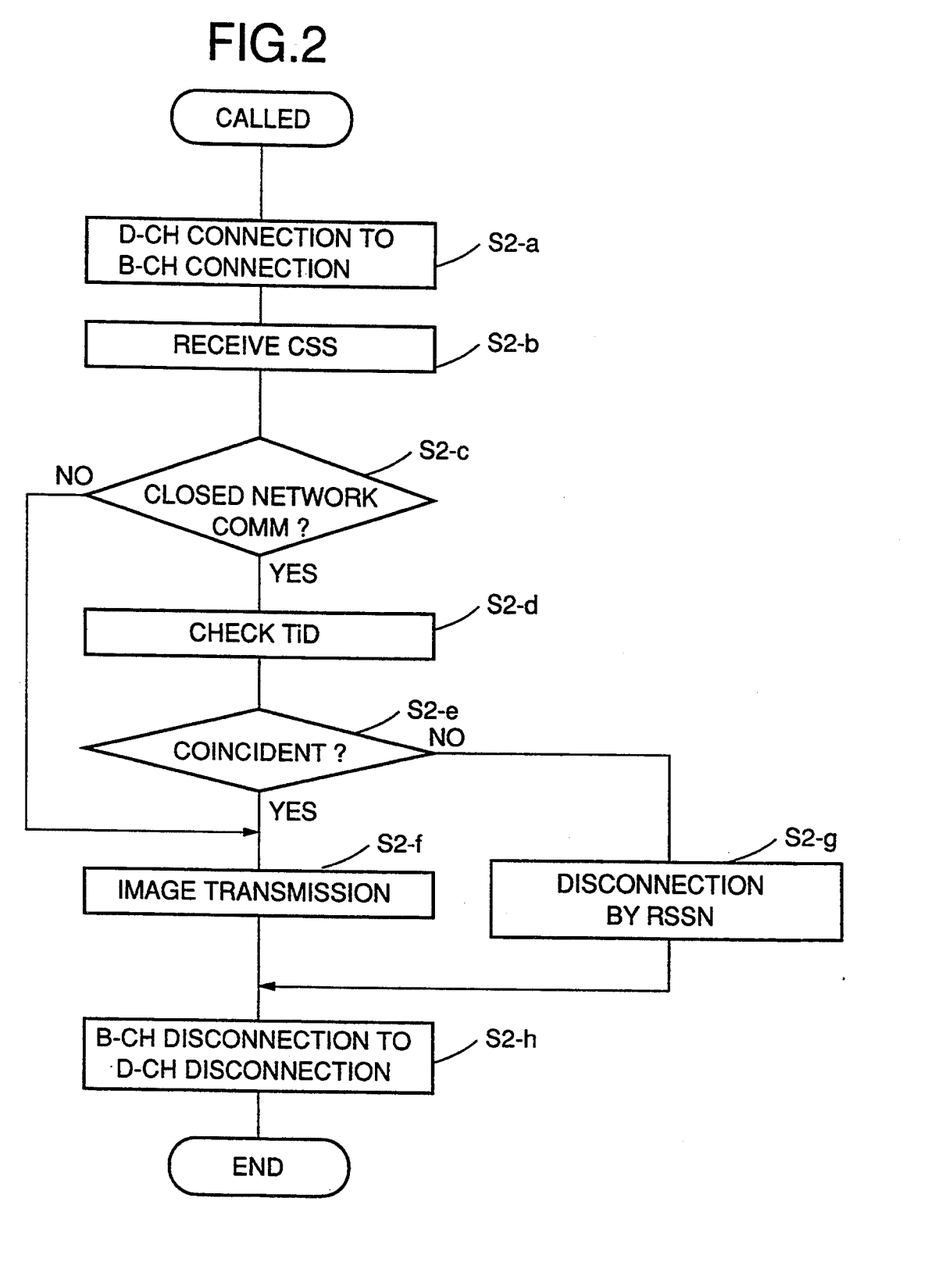
FIG. 2 is a flow chart showing a control operation at a called station.
Figures 3A, 3B:
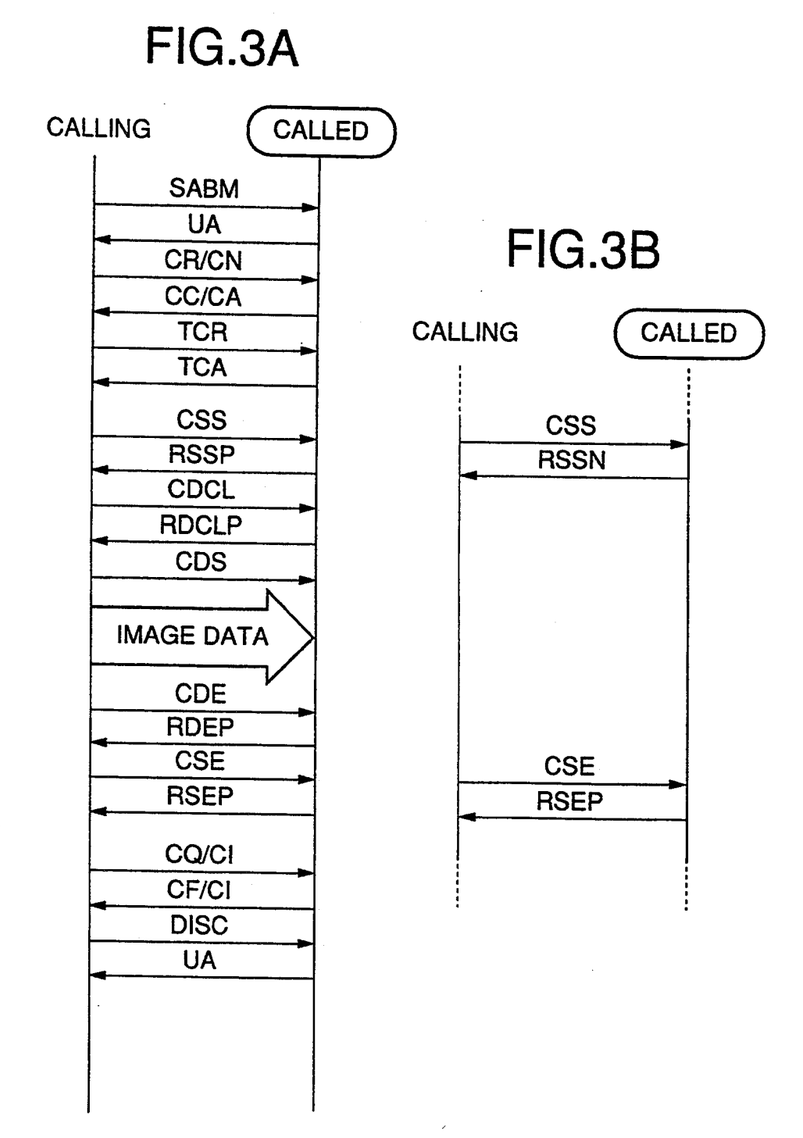
FIGS. 3A and 3B are charts showing a communication sequence at a called station.

The following description will be made with reference to the flow at the called station shown in FIG. 2, and the flow of communication signals shown in FIGS. 3A and 3B. In FIGS. 3A and 3B, a call control signal, i.e., a D-channel signal, is not shown.

In step S2-a, a line is connected in a known communication procedure from when a D-channel signal is received until a TCA (transport connection accept in a procedure of the CCITT recommendation T.70) is sent.

In step S2-b, a CSS is received. This signal includes a TiD of a calling station.

In step S2-c, whether or not a closed network communication is performed is selected. In this case, whether or not the closed network communication is performed must be selected in advance at the control unit, and the selection result must be stored in the control memory. According to this value, when the closed network communication is performed, the flow advances to step S2-d; otherwise, the flow advances to step S2-f.

In step S2-d, the TiD check operation described above is performed.

If it is determined in step S2-e that two TiDs coincide with each other, i.e., that a TiD that permits the closed network communication is detected, the flow advances to step S2-f; otherwise, the flow advances to step S2-g.

In step S2-f, image transmission is performed in a normal sequence shown in FIG. 3A.

In step S2-g, in order to disapprove a communication since a non-coincidence between the two TiDs is found, the line is disconnected in a sequence shown in FIG. 3B.

At this time, an RSSN includes a TiD (6-a) of the own station. However, in terms of management of the closed network communication, data is sent excluding Part 4 data of the own station TiD. An RSSP in step S2-f also includes an own station TiD. In this case, the Part 4 data is included.

In step S2-h, the line is disconnected in a known procedure from a CSE (session end command) to disconnection of a D channel.

The closed network communication at a calling station using the TiD check operation will be described below.

Figure 4:
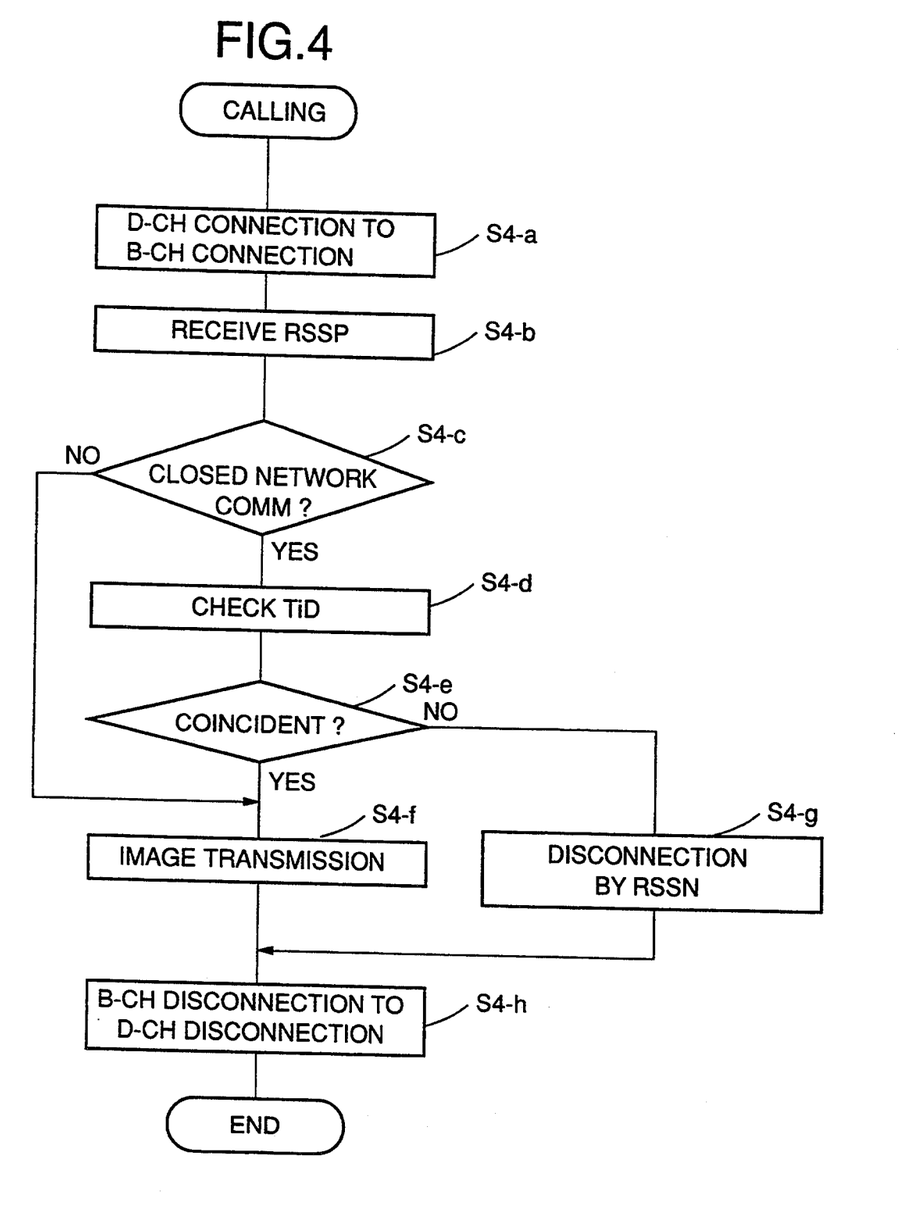
FIG. 4 is a flow chart showing a control operation at a calling station.
Figure 5A:
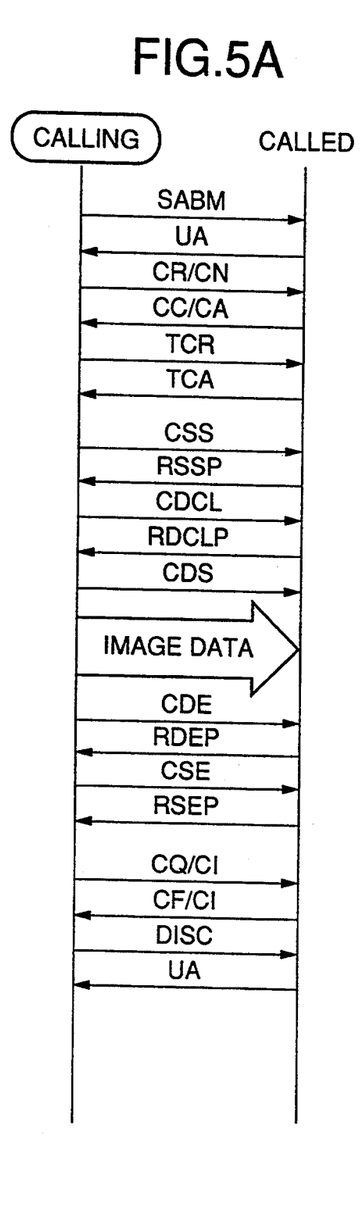
FIGS. 5A and 5B are charts showing a communication sequence at a calling station.
Figure 5B:
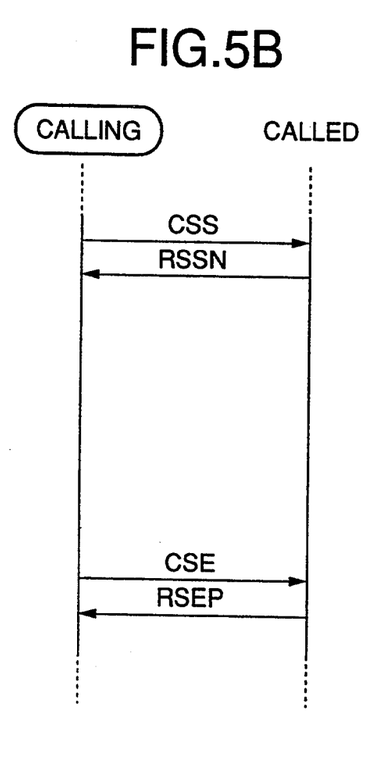

The following description will be made with reference to the flow at the calling station shown in FIG. 4, and the flow of communication signals shown in FIGS. 5A and 5B. In FIGS. 5A and 5B, a D-channel signal is not shown.

In step S4-a, a line is connected in a known communication procedure from when a D-channel signal is transmitted until a CSS is sent.

In step S4-b, an RSSP is received. This signal includes a TiD of a called station.

In step S4-c, whether or not the closed network communication is performed is selected. In this case, whether or not the closed network communication is performed must be selected in advance at the control unit, and the selection result must be stored in the control memory. According to this value, when the closed network communication is performed, the flow advances to step S4-d; otherwise, the flow advances to step S4-f.

In step S4-d, the above-mentioned TiD check operation is performed. If it is determined in step S4-e that two TiDs coincide with each other, the flow advances to step S4-f; otherwise, the flow advances to step S4-g.

In step S4-f, image reception is performed in a normal sequence shown in FIG. 5A.

In step S4-g, disconnection processing is performed in a sequence shown in FIG. 5B so as to interrupt transmission since two TiDs do not coincide with each other.

In step S4-h, the line is disconnected in a known communication procedure from an RSEP (session end positive response) to disconnection of the D channel.

Polling transmission utilizing the TiD check operation will be described below.

In order to perform the polling transmission, a called station must determine whether or not the own station is a destination to which polling transmission can be performed. Conventionally, polling IDs are determined in a free format in units of types of apparatuses. In addition, different methods of sending polling IDs are employed in units of types of apparatuses. In this embodiment, polling transmission utilizing a TiD having a standardized format will be described below.

The TiD check method is assumed to be the same as that described above, and how to utilize this method in the polling transmission will be described below.

Figure 9:
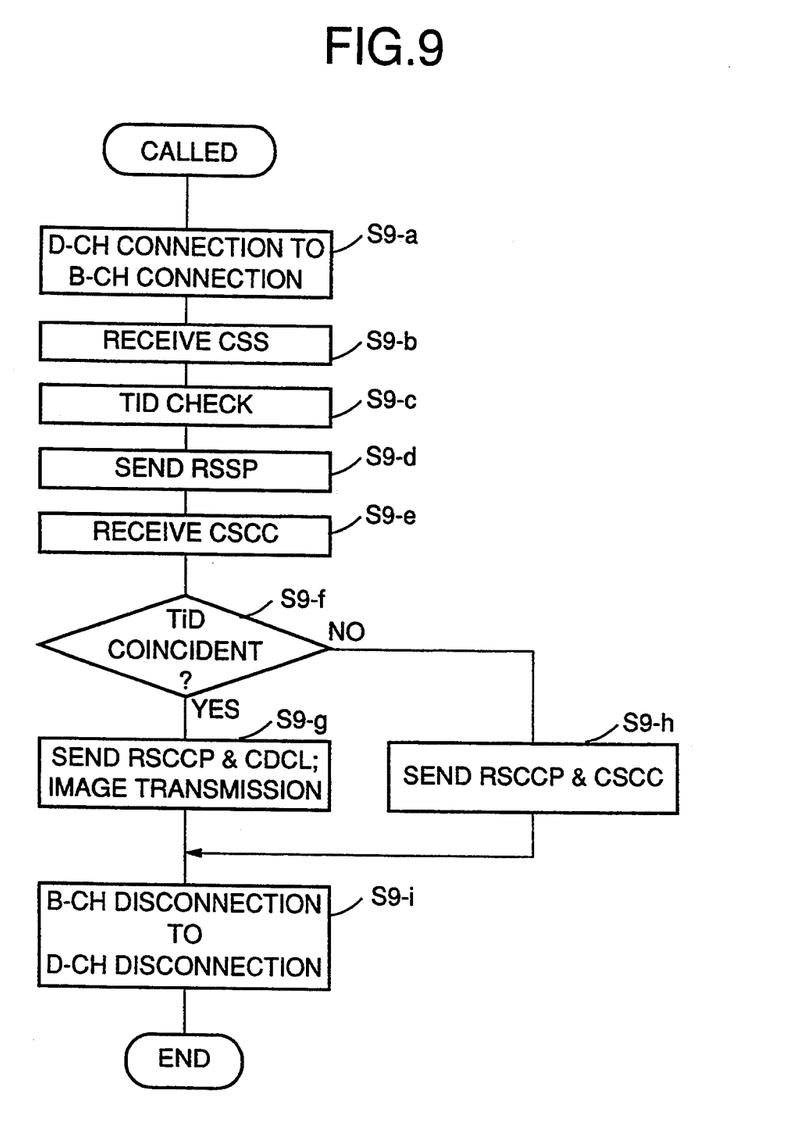
FIG. 9 is a flow chart showing a control operation in a polling mode.
Figures 10A, 10B:
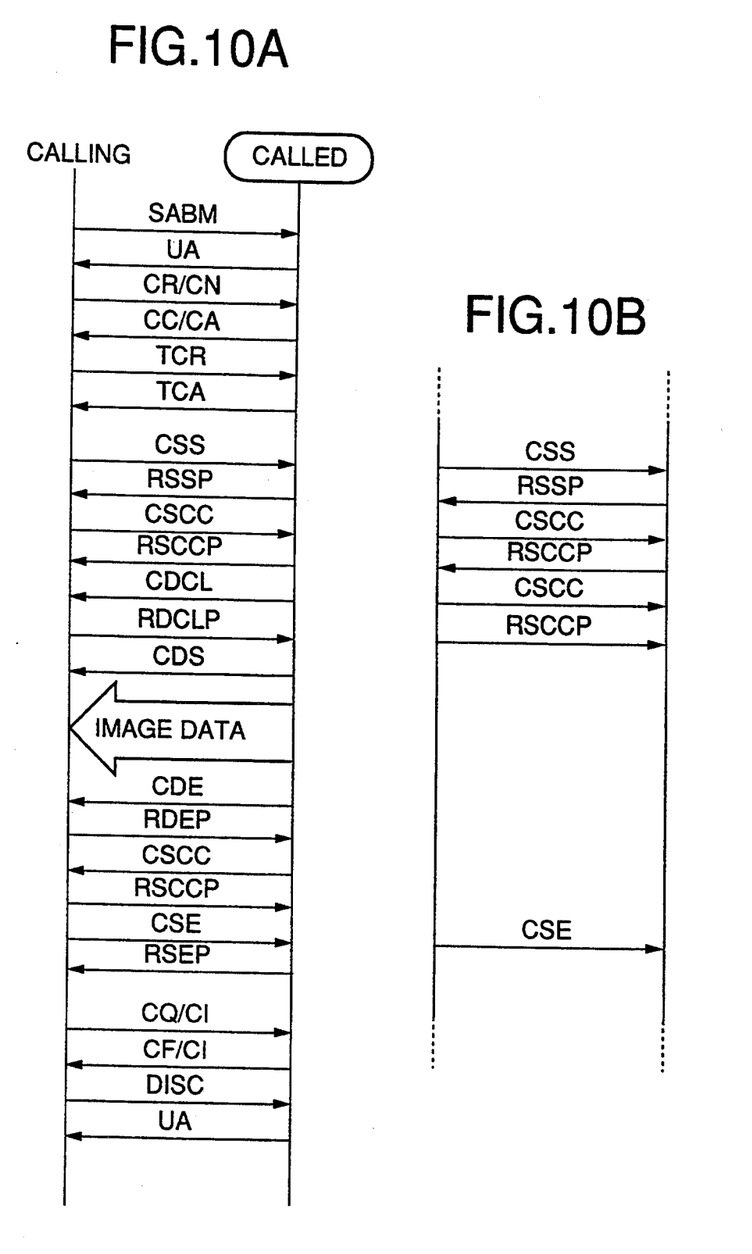
FIGS. 10A and 10B are charts showing a communication sequence in the polling mode.

The following description will be made with reference to the polling flow chart shown in FIG. 9, and the flow of communication signals shown in FIG. 10.

In step S9-a, a line is connected in a known communication procedure from when a D-channel signal is received until a TCA is sent.

In step S9-b, a CSS is received. This signal includes a TiD of a calling station.

In step S9-c, the TiD check operation described above with reference to the flow charts shown in FIGS. 7 and 8 is performed.

In step S9-d, an RSSP is sent. In step S9-e, a CSCC is received. The CSCC is a communication session layer reverse request, and it is determined that a polling transmission mode is requested.

If it is determined in step S9-f, as a result of the TiD check operation in step S9-c, that a coincidence is found between two TiDs, i.e., that the calling station is a destination with which polling transmission is permitted, the flow advances to step S9-g. On the other hand, if a non-coincidence is found between the two TiDs, it is determined that the calling station is a destination with which polling transmission is disapproved, and the flow advances to step S9-h.

When the flow advances to step S9-g, an RSCCP (session change control positive response) and a CDCL (document capability list command) are sent, and image transmission is performed in a known communication procedure.

When the flow advances to step S9-h, the RSCCP and the CSCC (session change control command) are sent, and a communication is interrupted in a known communication procedure.

In step S9-i, the line is disconnected in a known procedure from a CSE to disconnection of a D channel.

As described above, when signal data TiD used as standardized signals of G4 facsimile apparatuses are compared and judged, communications in various communication modes with normal G4 facsimile apparatuses can be realized.

When a called station TiD is checked, the degree of freedom of a check range can be greatly improved, and the data amount to be checked can be decreased. When the number of characters to be registered is limited (when the registered data amount is small), the number of stations to be registered can be increased as compared to an apparatus which registers the entire TiD.

The present invention is not limited to the above-mentioned embodiment, and various modifications may be made.

What is claimed is:

1. A communication apparatus for performing a communication in accordance with a predetermined communication procedure, comprising:
   storage means for storing in advance data indicating a name of a distant station to communication with;
   control means for comparing data indicating a name of a distant station included in a received predetermined communication procedure signal with the data stored in said storage means, and changing a communication procedure according to the comparison result; and
   setting means for setting a comparison range of the data stored in said storage means,
   wherein said control means compares the stored data in the comparison range set by said setting means with the received data indicating the name of the distant station.

2. An apparatus according to claim 1, wherein said control means converts the data stored in said storage means, and compares the received data with the converted data.

3. An apparatus according to claim 1, wherein when said control means determines a non-coincidence between the two data as a result of comparison, said control means ends a communication.

4. A communication apparatus for performing a communication in accordance with a predetermined communication procedure, comprising:
   storage means for storing in advance data indicating a name of a distant station to communicate with;
   control means for comparing data indicating a name of a distant station included in a received predetermined communication procedure signal with the data stored in said storage means, and changing a communication procedure according to the comparison result; and
   means for designating arbitrary character data in said storage means,
   wherein said control means compares the stored data excluding the designated character data with the received data indicating the name of the distant station.

5. A communication apparatus for performing a communication through a digital communication line in accordance with a communication procedure specified in a CCITT recommendation, comprising:
   storage means for storing in advance collation data to be compared with a terminal identifier included in a procedure signal in the communication procedure;
   control means for comparing the received terminal identifier with the collation data stored in said storage means, and changing the communication procedure according to the comparison result; and
   means for setting a comparison range of the collation data,
   wherein said control means performs comparison processing using data in the set comparison range of the collation data.

6. An apparatus according to claim 5, wherein said control means compares the terminal identifier with the data stored in said storage means in a calling state.

7. An apparatus according to claim 5, wherein said control means compares the terminal identifier with the data stored in said storage means in a called state.

8. An apparatus according to claim 5, wherein said control means converts the collation data, and compares the converted data with the terminal identifier.

9. A communication apparatus for performing a communication through a digital communication line in accordance with a communication procedure specified in a CCITT recommendation, comprising:
   storage means for storing in advance collation data to be compared with a terminal identifier included in a procedure signal in the communication procedure;
   means for designating arbitrary character data of the collation data; and
   control means for comparing the received terminal identifier with the collation data stored in said storage means, and changing the communication procedure according to the comparison result,
   wherein said control means performs comparison processing excluding the designated character data.

10. A communication apparatus for performing a communication through a digital communication line in accordance with a communication procedure specified in a CCITT recommendation, comprising:
    storage means for storing in advance collation data to be compared with a terminal identifier included in a procedure signal in the communication procedure; and control means for comparing the received terminal identifier with the collation data stored in said storage means, and changing the communication procedure according to the comparison result, wherein said control means changes a terminal identifier to be transmitted according to the comparison result.

11. A communication method for performing a communication through a digital communication line in accordance with a communication procedure specified in a CCITT recommendation, comprising the steps of:
registering in advance collation data to be compared with a terminal identifier included in a procedure signal in the communication procedure;
setting a comparison range; and
comparing the received terminal identifier with the collation data in the set comparison range, and changing the communication procedure according to the comparison result.

12. A method according to claim 11, further comprising the step of converting the collation data, and comparing the converted data with the received terminal identifier.

13. A communication method for performing a communication through a digital communication line in accordance with a communication procedure specified in a CCITT recommendation, comprising the steps of:
registering in advance collation data to be compared with a terminal identifier included in a procedure signal in the communication procedure;
designating arbitrary character data of the collation data; and
comparing the collation data excluding the designated character data with the received terminal identifier and changing the communication procedure according to the comparison result.

* * * * *

UNITED STATES PATENT AND TRADEMARK OFFICE
CERTIFICATE OF CORRECTION

PATENT NO. : 5,381,240
DATED : January 10, 1995
INVENTOR(S) : MASAHIRO MURAYAMA

It is certified that error appears in the above-identified patent and that said Letters Patent is hereby corrected as shown below:

COLUMN 1

Line 41, "pose." should read --posed.--.

COLUMN 2

Line 12, "apparatus ," should read --apparatus,--.

COLUMN 4

Line 46, boldface should be deleted.

COLUMN 5

Line 8, "SS-h;" should read --S8-h;--.

COLUMN 7

Line 48, "communication" should read --communicate--.

Signed and Sealed this

Sixth Day of June, 1995

*Attest:*

BRUCE LEHMAN

*Attesting Officer           Commissioner of Patents and Trademarks*